US007831489B2

(12) United States Patent
Hamel et al.

(10) Patent No.: US 7,831,489 B2
(45) Date of Patent: Nov. 9, 2010

(54) CORRELATION OF BILLING INFORMATION BY A NETWORK ELEMENT

(75) Inventors: Eric Hamel, Paris (FR); Kevin Shatzkamer, San Francisco, CA (US); Louis F. Menditto, Raleigh, CA (US); Chris O'Rourke, Apex, NC (US); Haihong Zhu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 2 days.

(21) Appl. No.: 11/781,825

(22) Filed: Jul. 23, 2007

(65) Prior Publication Data

US 2009/0030820 A1 Jan. 29, 2009

(51) Int. Cl.
*G07F 19/00* (2006.01)
*H04M 15/00* (2006.01)

(52) U.S. Cl. ......................... 705/34; 370/352; 370/253; 370/252; 370/389; 455/405; 455/406

(58) Field of Classification Search ..................... 705/1, 705/34; 379/112.05, 114.28, 126, 121.01, 379/120, 219, 229; 709/224, 223; 455/408, 455/406; 370/230, 253, 389, 352
See application file for complete search history.

(56) References Cited

U.S. PATENT DOCUMENTS 5,793,853 A * 8/1998 Sbisa ......................... 379/120
6,714,978 B1 * 3/2004 Porter ......................... 709/224
7,010,104 B1 * 3/2006 Cai et al. ..................... 379/126
2007/0002844 A1 * 1/2007 Ali ............................. 370/352
2007/0147594 A1 * 6/2007 Aaron et al. ........... 379/114.28
2007/0213031 A1 * 9/2007 Ejzak et al. ................. 455/406

(Continued)

OTHER PUBLICATIONS

"WaterCove Networks: WaterCove Networks unlocks USD87 billion opportunity with industry's first mobile data service system; Allows operators to rapidly and profitably deliver "Always-On" mobile data services on 2.5G and 3G GPRS/UMTS and CDMA Networks." M2 Presswire Feb. 18, 2002 ProQuest Newsstand, ProQuest. Web. Jun. 10, 2010.*

(Continued)

*Primary Examiner*—Matthew S Gart
*Assistant Examiner*—Olusegun Goyea
(74) *Attorney, Agent, or Firm*—Tellis IP Law Group, PC

(57) ABSTRACT

In one embodiment, a method for providing correlation of billing entries for a mobile communications network is provided. A correlating network element in a bearer path determines a plurality of billing entries for a flow. One or more of the billing entries may be received from other network elements and includes traffic altering information for a flow. The correlating network element correlates the plurality of billing entries using state information included in the billing entries. The state information is used to determine information in billing entries that may be related, such as billing entries for a single flow. Also, the correlating network element uses the traffic altering information to determine a data volume sent for the flow. A correlated billing entry may then be generated using the data volume for the flow. The correlated billing entry is then sent to a billing system from the correlating network element. Billing entries are not sent from other network elements that may be generating billing entries in a link to the billing system.

21 Claims, 4 Drawing Sheets

U.S. PATENT DOCUMENTS

| | | | | |
|---|---|---|---|---|
| 2008/0049640 | A1* | 2/2008 | Heinz et al. | 370/252 |
| 2008/0049641 | A1* | 2/2008 | Edwards et al. | 370/253 |
| 2008/0049745 | A1* | 2/2008 | Edwards et al. | 370/389 |
| 2008/0049927 | A1* | 2/2008 | Wiley et al. | 379/230 |
| 2008/0052206 | A1* | 2/2008 | Edwards et al. | 705/34 |
| 2008/0052387 | A1* | 2/2008 | Heinz et al. | 709/223 |
| 2008/0052393 | A1* | 2/2008 | McNaughton et al. | 709/224 |
| 2008/0052784 | A1* | 2/2008 | Wiley et al. | 726/28 |
| 2008/0123625 | A1* | 5/2008 | Buckley | 370/352 |
| 2008/0279183 | A1* | 11/2008 | Wiley et al. | 370/389 |
| 2009/0030820 | A1* | 1/2009 | Hamel et al. | 705/34 |

OTHER PUBLICATIONS

"Cbeyond Collaborates with Industry Leaders to Launch IP PBX VoIP Interoperability Initiative." Business Wire Feb. 7, 2005 Business Dateline, ProQuest. Web. Jun. 10, 2010.*

"Empirix Announces New MGC Emulator on the Hammer NXT." PR Newswire Jan. 28, 2003 Business Dateline, ProQuest. Web. Jun. 10, 2010.*

"Configuring Enhanced Service-Aware Billing" , Aquired at http://www.cisco.com/en/US/products/ps6706/products_feature_guide_chapter09186a0080584e72.html, Cisco GGSN Release 6.0 Configuration Guide, Cisco IOS Release 12.4(2)XB5, 27 pages.

* cited by examiner

CORRELATION OF BILLING INFORMATION BY A NETWORK ELEMENT

TECHNICAL FIELD

Particular embodiments generally relate to networking.

BACKGROUND

Mobile communication networks use a large array of network elements that have traffic visibility. These elements may impact the volume of content traffic sent/received to/from a user. The network elements generally operate independently of each other; thus, one element is unaware of information/handling of traffic that is known only to other network elements.

Each network element may send billing information separately to a billing office. Because each network element is unaware of what is happening with other network elements, this may create inconsistencies in billing, such as the billing reports may be incomplete or inaccurate from a charging perspective. For example, when a proprietary tunnel is set up, protocol awareness of the traffic is lost and the packets cannot be inspected to determine billing information from them. Thus charging for that flow cannot be determined by a downstream element. Also, because each network element includes a link to the billing office, large amounts of traffic may be sent to the billing office. As more network elements are added to the network, more links and bandwidth are used to send the billing information to the billing office, which results in inefficient use of these billing links (which may run over alternate, higher cost media to a central billing location).

DESCRIPTION OF EXAMPLE EMBODIMENTS

Overview

In one embodiment, a method for providing correlation of billing entries for a mobile communications network is provided. A correlating network element in a bearer path determines a plurality of billing entries for a flow. One or more of the billing entries may be received from other network elements and includes traffic altering information for a flow. The correlating network element correlates the plurality of billing entries using state information included in the billing entries. The state information is used to determine information in billing entries that may be related, such as billing entries for a single flow. Also, the correlating network element uses the traffic altering information to determine a data volume sent for the flow. A correlated billing entry may then be generated using the data volume for the flow. The correlated billing entry is then sent to a billing system from the correlating network element. Billing entries are not sent from other network elements that may be generating billing entries in a link to the billing system. Rather, a correlating network element does the correlation and can then send correlated billing entries to the billing system. This alleviates unnecessary links between the billing system and other network elements and save the cost used to send the billing information over the links. Further, the correlation is performed in the network and intelligence may be used in generating the billing entries. For example, any inaccuracies may be corrected or changes to charges may be performed based on information from other network elements that was previously only known to the other network elements and alleviates the need for a correlating network element to inspect and parse packets that may be sent in a proprietary tunnel.

EXAMPLE EMBODIMENTS

Figure 1:
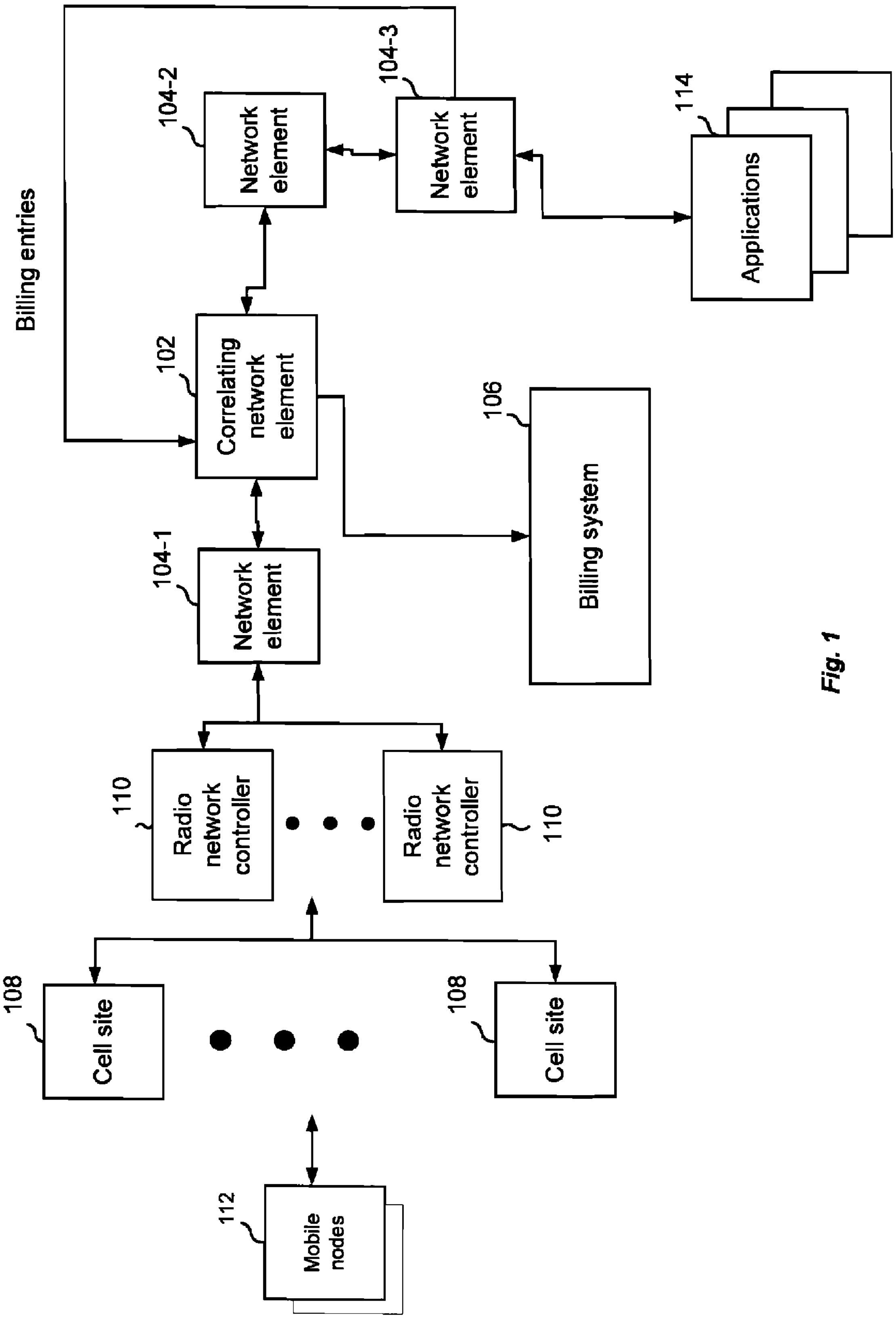
FIG. 1 depicts an example of a system for correlating billing entries.

FIG. 1 depicts an example of a system for correlating billing entries. In one embodiment, the system includes a mobile communications system; however, it will be understood that other communication systems may be appreciated.

In mobile communications systems, a plurality of cell sites 108 and a radio network controller 110 are provided. Mobile nodes 112 may communicate through cell sites 108 and radio network controllers 110 to network element 104-1. Cell sites 108 and radio network controllers 110 are known in the art and need not be described further.

Mobile nodes 112 may be any mobile device, such as a cellular phone, personal digital assistant (PDA), smart phone, laptop computer, etc. Although a cellular communication system is described, it will be understood that other systems may be used, such as a wireless fidelity (WiFi) network, a wired network, etc.

Traffic for mobile node 112 may then be sent to network element 104-1. In one embodiment, network element 104-1 may be a packet gateway, such as a gateway GPRS support node (GGSN), packet data serving node (PDSN), access service network (ASN) gateway, a packet data gateway (PDG), etc. Network element 104-1 may be an interface between different networks.

A correlating network element 102 may correlate information in billing entries from other network elements 104. Correlating network element 102 may then generate a correlated billing entry using information from multiple billing entries and send it to a billing system 106. A correlated billing entry may be where information received from two different network elements (e.g, correlating network element 102 and/or network elements 104) is used to create a billing entry. A billing entry may be any information that includes billing/charging information for mobile nodes 112. The billing entry may include information for a single flow of multiple flows. The correlation may be where two entries are received from different network elements for a flow, and correlating network element 102 determines that the two entries are related. Then, correlating network element 102 may correlate them together by associating them with each other.

In one embodiment, correlating network element 102 may be a layer 7 charging node. A layer 7 charging node may be configured to determine charging information from application layer information. For example, the charging information may be for applications 114 being accessed by mobile node 112. Examples of the layer 7 information may be information that allows an accurate charge/count for traffic sent/received to/by mobile node 112 for certain applications 114. In one example, the amount of data downloaded for a ringtone download may be determined.

In one embodiment, correlating network element 102 sits in the bearer path and receives packets for/from mobile node 112. Network elements 104-2 and 104-3 may be other network elements in the bearer path. Network element 104-1 also sits in the bearer path and can generate billing entries, but for discussion purposes, it is assumed network elements 104-1-104-3 generate the billing entries. These network elements 104 may provide various services. For example, network element 104-2 may be a traffic packet optimizer (TPO). A traffic packet optimizer may compress traffic such that less bandwidth is used. A traffic packet optimizer may set up a proprietary tunnel, such as a proprietary transmission control protocol (TCP) or a user datagram protocol (UDP) encapsulation, to send traffic to mobile node 112 or applications 114. When a proprietary tunnel is used, layer 7 information may not be determined from downstream nodes. For example, network element 104-3 may not be able to read the traffic because deep packet inspection may be needed to determine protocol-related information. The protocol-related information provides the application layer information, such as which flows the packets are for and for what applications 114, which allows billing to be performed for mobile node 112. However, if a proprietary tunnel is used, the packet may not be inspected for the presence of significant billing events (for example a billable URL for a ringtone download may not be parseable) and thus billing information may not be determined.

Network element 104-3 may be a caching node. The caching node may cache data until it is ready to be sent. Information for the data being cached may be needed for billing purposes. For example, caching information may be useful to determine how much data was cached and for how long. This may be pertinent for billing in service level agreements. Other network nodes, although not shown, may also include nodes that perform gating, policing, denial of traffic flows, etc.

Network elements 104 and correlating network element 102 may be in the bearer path. That is, data traffic being sent between mobile node 112 and applications 114 passes through these network elements. Accordingly, the correlation is performed by network elements in the bearer path. This is different from performing correlation in billing system 106. Because the correlation is performed in the bearer path (i.e., the network), intelligence may be added in generating the billing entries. Also, the single billing link can be used to report accurate data volume information that represents the number of bytes actually transferred to the user after optimization, and include information on billable layer 7 events such as ringtone download.

Because of the network location of a network element, information sent in packets from caching node and TPO node may not be received at correlating network element 102 (e.g., a network node may be upstream from the node or if it is downstream, it cannot inspect information in the packet). Also, the data sent from the caching and TPO may be altered because of the caching of data or optimization. For example, less data volume may be sent because of traffic optimization or caching of data. However, correlating network element 102 may not be able to determine an accurate data volume count because it may be upstream. Also, correlating network element 102 may not be able to inspect packets sent in a proprietary tunnel and cannot associate a packet count with a billing event. Thus, particular embodiments provide a feedback loop that is used to send billing information to correlating network 102.

Accordingly, correlating network element 102 may correlate the billing entries into a correlated billing entry. For example, information in billing entries for a flow may be correlated and included in a correlated billing entry. The correlation involves receiving information from network element 104-2 and/or 104-3 for a flow. Correlating network element 102 determines the information is for the same flow thus correlating the received information together. Accordingly, the information is put or brought into a causal, complementary, parallel, and/or reciprocal relation at correlating network element 102. Then, one or more billing entries may be generated for the information received from network element 104-2 and 104-3. Thus, billing information sent from network element 104-2 and/or network element 104-3 for a flow may be correlated into a correlated billing entry (billing information determined at correlating network element 104-2 may also be included in the correlated billing entry).

Correlating network element 102 is able to provide accurate data volume count (including adjustments for data not served or compressed over a link between the TPO and mobile node 112) while also reporting accurate layer 7 billing data such as URLs downloaded. The adjusted data volume count is different than the data served originally. For example, application 114 may serve a certain amount of data. However, a network element may compress the data and serve it to mobile node 112. In some cases, mobile node 112 should be charged for a lower data volume because the data was compressed. By providing the feedback loop, the network element that compressed the data can send the traffic altering information (e.g., packet count or other compression information) on how the traffic was altered to correlating network element 102, which can provide the accurate account for the correct billing event.

By providing the feedback loop where traffic altering information is sent to correlating network element 102, correlating network element 102 does not need to understand and parse packets sent by the network element, which might have been sent in a proprietary tunnel. The traffic altering information may be used to determine an adjusted data volume that is different from the data sent from application 114 (because less data may be sent when it is compressed, cached, etc.). Also, if a feedback loop was not provided, then individual network elements might have sent different packet counts to a billing system separately, which may have caused inaccuracies in billing.

The correlation may be performed based on a number of factors. For example, billing information is correlated per flow, per mobile node, etc. Thus, in one example, billing information is correlated on a per-flow basis from the billing entries. The correlated billing entry may then be sent from correlating network element 104-2 to billing system 106.

A link from correlating network element 102 to billing system 106 is needed, but links from network element 104-1, network element 104-2, and network element 104-3 are not needed. This alleviates unnecessary traffic and further, correlating network element 102 may use information from other network elements 104 to determine any intelligent action that needs to be made for billing purposes. For example, traffic sent through a proprietary tunnel may be determined and charged for.

Billing system 106 may then use a correlated billing entry to charge or reimburse mobile node 112 for traffic. Also, billing system 106 may use the information to re-authorize a prepaid balance, terminate a user flow, re-rate the traffic for charging purposes, reimburse the prepaid billing server, or perform any other intelligent action.

Figure 2:
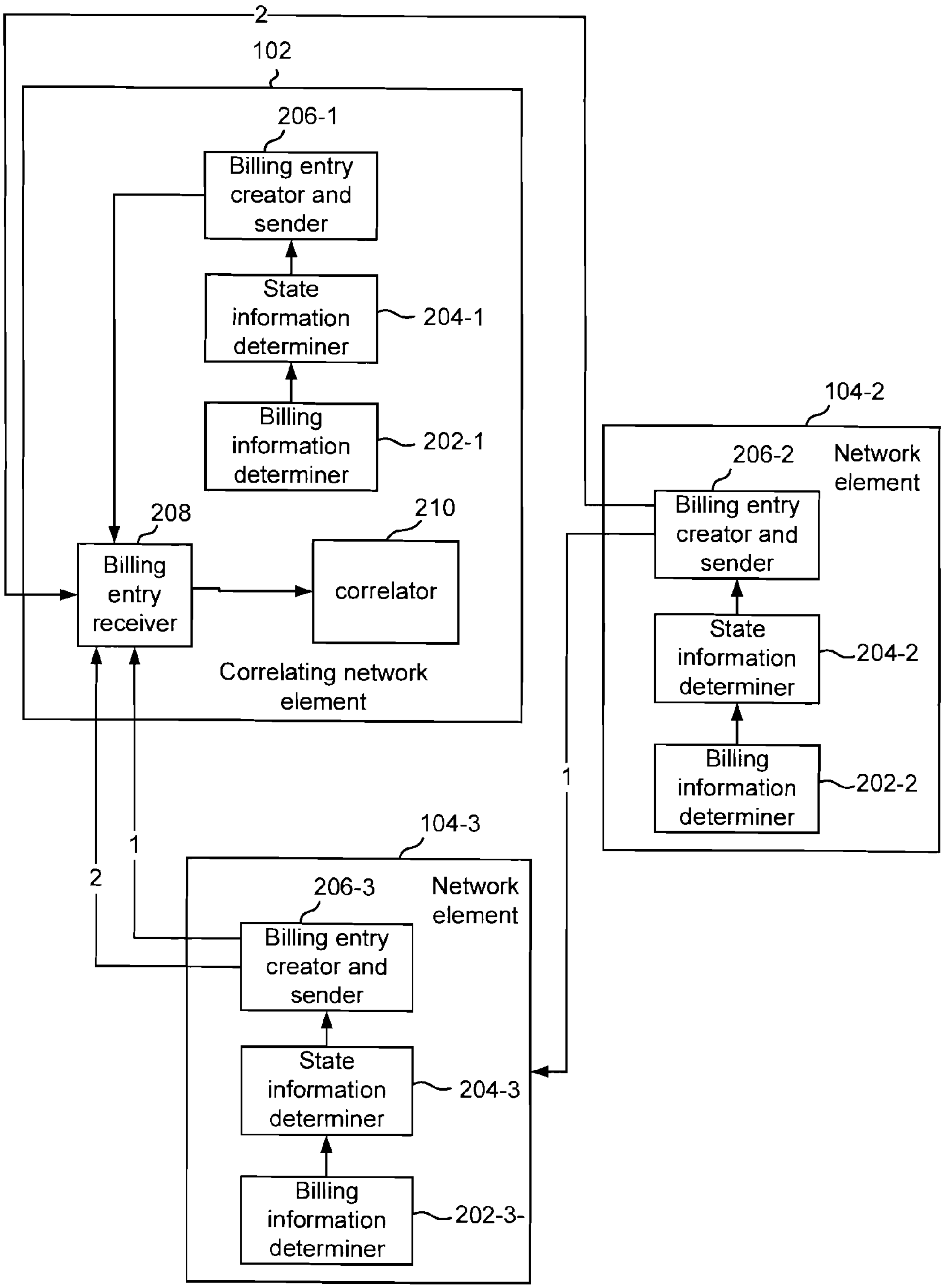
FIG. 2 depicts a more detailed example of correlating network element and other network elements.

FIG. 2 depicts a more detailed example of correlating network 102 and network elements 104-2 and 104-3. Although these network elements are shown, it will be understood that other network elements may also be provided. Network elements 104 include a billing information determiner 202, a state information determiner 204, and a billing entry creator and sender 206.

Billing information determiner 202 may determine billing information. For example, if network element 104-2 is a traffic packet optimizer, flow-based information may be determined. The flow-based information may include layer 7 information, compression ratio, or any information that is specifically known only to the traffic packet optimizer. This information is determined for each flow in the bearer path may provide traffic altering information that can be used to determine an adjusted data volume count for a flow.

Also, if network element 104-3 is a caching node, information based on caching of packets in flows may be determined. For example, information may include cached status, percentage of traffic received from cache, digital rights management information, streaming media-specific information, and other information specifically known only to the caching node. This information may also be used to determine the adjusted data volume count for a flow.

State information determiner 204 may determine state information for a flow. For example, to correlate billing entries from different network elements 104, state information is needed. The state information may include information that identifies the flow that traffic is sent through. For example, state information may include source information (an IP address for mobile node 112), destination information (IP address for application 114), port information, etc.

Billing information determiner 202 and state information determiner 204 may use deep packet inspection to determine the billing information and/or state information. For example, information that can be determined includes the hypertext transfer protocol (HTTP) information, uniform resource locator (URL) information, real time streaming protocol (RTSP) information, or any other information for a flow. This provides information that can be used to generate the billing entry.

Billing entry creator and sender 206 then creates a billing entry and sends it to correlating network element 102. The billing entry includes the state information and the billing information. The billing entry may include information for a single flow or multiple flows.

In one embodiment, a feedback loop may be created from network element 104-2 to network element 104-3 to correlating network element 102 (labeled "1" in FIG. 2). When this feedback loop is created, the billing entry may be sent from network element 104-2 to network element 104-3. Network element 104-3 also now has the option to review the billing entry and may use it in generating its own billing entries. This may provide intelligence in the network. A chain of intelligent network elements 104 may relay traffic altering information through the system to allow for accurate billing. Network element 104-3 may also generate its own billing entry and send it to correlating network element 102 in addition to the other billing entry from network element 104-2.

In another embodiment, each billing entry creator and sender 206 for network elements 104-2 and 104-3 may individually send the billing entries directly to correlating network element 102. For example, billing entry creator and sender 206-2 may send billing entries separately to correlating network element 102 from billing entry creator and sender 206-3 (labeled "2" in FIG. 2). Thus, individual feedback loops may be created between correlating network element 102 and other network elements 104.

A billing entry receiver 208 in correlating network element 102 is configured to receive the billing entries. Correlating network element 102 may also include its own billing information determiner 202, a state information determiner 204, and a billing entry creator and sender 206, which create billing entries and send them to billing entry receiver 208. Billing entry receiver 208 may process the entries, such as stripping data out of the payload of packets, etc.

A correlator 210 is then configured to correlate the billing entries. For example, billing information in the billing entries is correlated based on a flow each of the billing entries is associated with. Thus, a flow-based correlation may be determined where information for a flow is correlated at correlating network element 104 to determine an adjusted volume data count for a flow. For example, a flow ID is used to determine the traffic altering information for a flow. The traffic data count for a billing entry with the same flow ID may then be altered based on the traffic altering information. Thus, correlator 214 determines that billing information is for the same flow. The billing information is then correlated together and analyzed to determine the adjusted volume data count. Correlator 214 can then send the correlated billing entries to billing system 106.

Figure 3:
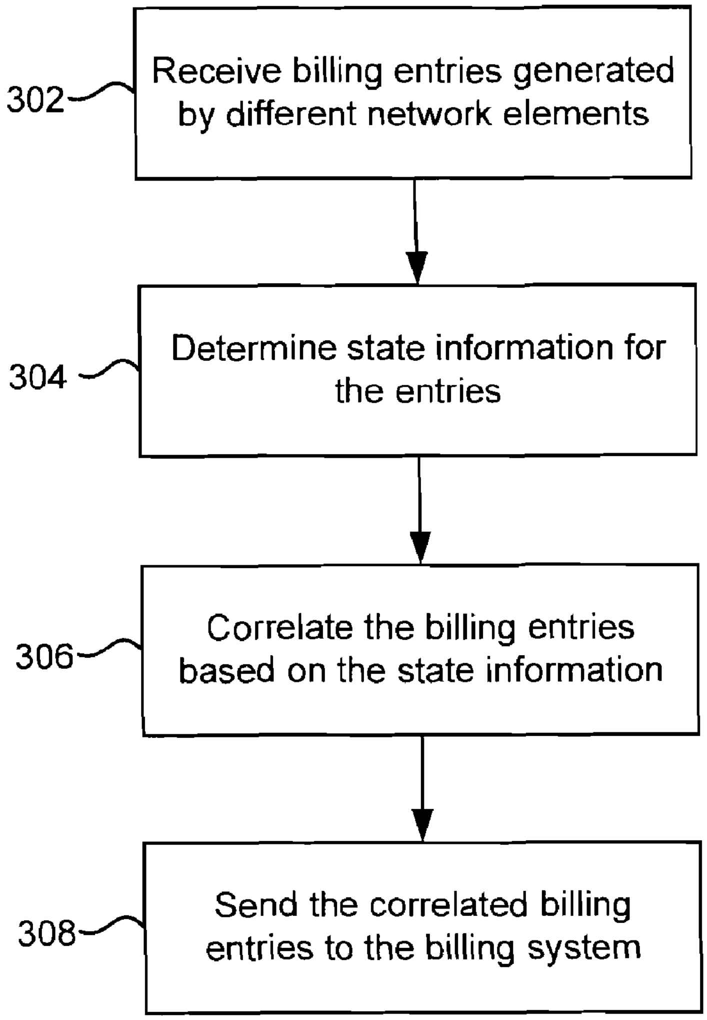
FIG. 3 depicts an example of a method for correlating billing entries in the network.

FIG. 3 depicts an example of a method for correlating billing entries in the network. In one embodiment, the method is performed at correlating network element 102.

Step 302 receives billing entries generated by different network elements 104. For example, network elements 104-2 and 104-3 may generate billing entries and send them to correlating network element 102. Thus, a feedback loop is created between network elements 104 to correlating network element 102.

Step 304 determines state information for the entries. Because entries may be received for different flows at correlating network element 102, state information is needed to determine which entries are for the same flow.

Step 306 correlates information for the billing entries based on the state information. For example, billing information for the same flow may be correlated together from the billing entries. Also, it will be understood that mobile nodes 112 may have multiple flows and thus multiple flows may be correlated together.

Step 308 then sends the correlated billing entries to billing system 106. Accordingly, for all the billing entries that are received in step 302, correlated billing entries are generated and sent. This alleviates each different billing entry being sent to billing system 106 by different network elements and also allows the correlation to be performed in the network, which eliminates excess traffic on links to billing system 106.

Figure 4:
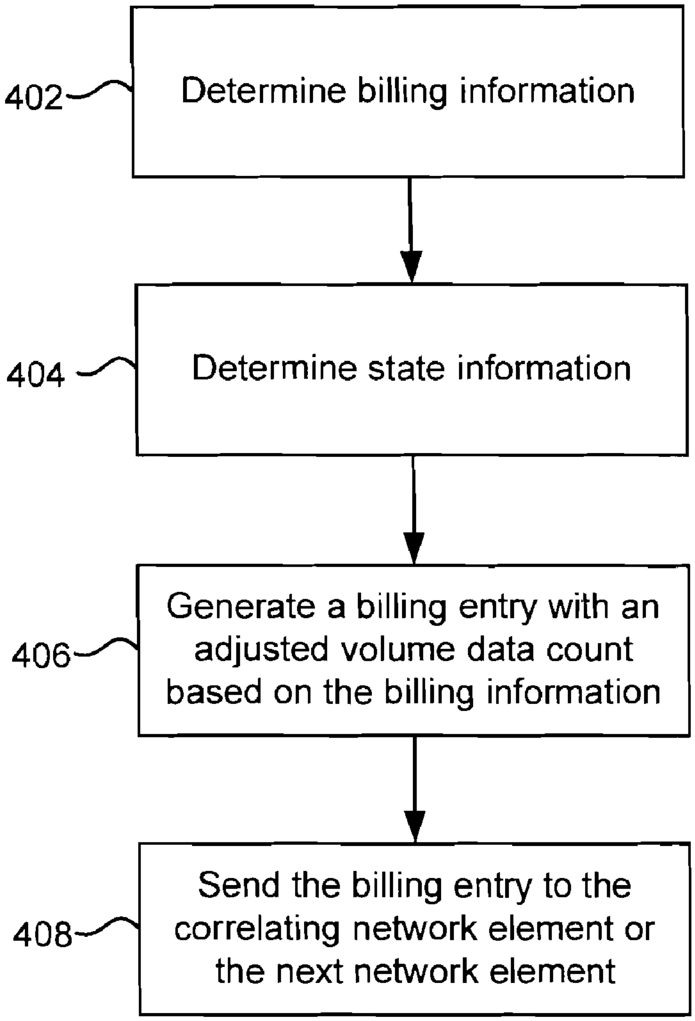
FIG. 4 depicts an example of a method for generating billing entries.

FIG. 4 depicts an example of a method for generating billing entries. Step 402 determines billing information. The billing information may be any information that may be known only to network element 104.

Step 404 determines state information. The state information may identify a flow for the billing information.

Step 406 generates a billing entry with an adjusted volume data count based on the billing information. Step 408 then sends the billing entry to correlating network element 104 or the next network element 104. Thus, a feedback loop may be generated in which billing entries are sent back to correlating network element 102.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store, the program for use by or in connection with the instruction execution system, apparatus, system, or device. The computer readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:

receiving data for a flow at a correlating network element in a bearer path, the bearer path being a path in which the data are sent for the flow to a node through the correlating network element;

sending, from the correlating network element, the data for the flow to the node;

determining, at the correlating network element, a plurality of billing entries, wherein a first billing entry in the plurality of billing entries is received from a second network element in the bearer path, the first billing entry including traffic altering information for the data sent by the second network element for the flow;

correlating information in the plurality of billing entries into a correlated billing entry for the node using the first billing entry, the correlating network element using the traffic altering information from the first billing entry to determine a second data volume sent for the flow from a first data volume specified by a second billing entry in the plurality of billing entries for the data sent for the flow, wherein the traffic altering information is used to alter the first data volume to determine the second data volume based on how data being sent by the second network element was altered by the second network element; and sending the correlated billing entry including the second data volume to a billing system from the correlating network element through a link from the correlating network element to the billing system, wherein the second billing entry is not sent to the billing system.

2. The method of claim 1, wherein determining the plurality of billing entries comprises receiving the first billing entry in a feedback loop from the second network element to the correlating network element.

3. The method of claim 1, further comprising receiving the first billing entry at the correlating network element from the second network element instead of the second network element sending the first billing entry to the billing system.

4. The method of claim 1, wherein the first billing entry comprises billing entries from a plurality of network elements.

5. The method of claim 1, wherein correlating the information in the plurality of billing entries comprises correlating billing information for a billing event together.

6. The method of claim 5, wherein the traffic altering information for the flow is used to determine that the first data volume is for the billing event, and wherein the correlating network element is not able to inspect packets in the flow for the first data volume to determine that the packets are for the billing event.

7. The method of claim 1, wherein the first billing entry is not sent to the billing system by the second network element through a link between the second network element to the billing system.

8. A system, comprising:

one or more network elements configured to process packets sent in a bearer path between an application and a mobile node, the one or more network elements generating billing entries based on the processing of the packets; and a correlating network element in the bearer path, the correlating network element being configured to:

receive packets for the flow, the bearer path being a path in which packets are sent for the flow to the one or more network elements through the correlating network element;

send the packets for the flow to the one or more network elements;

receive the billing entries from the one or more network elements for the packets sent, wherein the billing entries include traffic altering information for the flow;

correlate information in a first billing entry into one or more correlated billing entries, the correlating network element using the traffic altering information to determine a second data volume sent for the flow from a first data volume specified by a second billing entry in the billing entries for the data sent for the flow, wherein the traffic altering information is used to alter the first data volume to determine the second data volume based on how data being sent by the second network element was altered by the second network element; and send the correlated billing entry including the second data volume to a billing system through a link from the correlating network element to the billing system, wherein the second billing entry is not sent to the billing system.

9. The system of claim 8, wherein the one or more network elements comprise a first network element and a second network element, the first network element generating the first billing entry and the second network element generating the second billing entry.

10. The system of claim 9, wherein the first network element sends the first billing entry to the second network element, the second network element using the first billing entry to generate the second billing entry and then sending the first and second billing entry to the correlating network element.

11. The system of claim 8, wherein the one or more network elements do not have a link to send billing entries to the billing system without sending the billing entries to the correlating network element.

12. The system of claim 8, wherein the information in the plurality of billing entries correlates billing information for a billing event together.

13. The system of claim 12, the traffic altering information for the flow is used to determine that the first data volume is for the billing event, wherein the correlating network element is not able to inspect packets in the flow for the first data volume to determine that the packets are for the billing event.

14. An apparatus, comprising:

one or more computer processors; and logic encoded in one or more tangible storage media for execution by the one or more computer processors, and when executed operable to:

receive data for a flow at a correlating network element in a bearer path, the bearer path being a path in which the data are sent for the flow to a node through the correlating network element;

send, from the correlating network element, the data for the flow to the node;

determine, at the correlating network element, a plurality of billing entries, wherein a first billing entry in the plurality of billing entries is received from a second network element in the bearer path, the first billing entry including traffic altering information for the data sent by the second network element for the flow;

correlate information in the plurality of billing entries into a correlated billing entry for the node using the first billing entry, the correlating network element using the traffic altering information from the first billing entry to determine a second data volume sent for the flow from a first data volume specified by a second billing entry in the plurality of billing entries for the data sent for the flow, wherein the traffic altering information is used to alter the first data volume to determine the second data volume based on how data being sent by the second network element was altered by the second network element; and send the correlated billing entry including the second data volume to a billing system from the correlating network element through a link from the correlating network element to the billing system, wherein the second billing entry is not sent to the billing system.

15. The apparatus of claim 14, wherein the logic, when executed, is further operable to receive the first billing entry in a feedback loop from the second network element to the correlating network element.

16. The apparatus of claim 14, wherein the logic, when executed, is further operable to receive the first billing entry at the correlating network element from the second network element instead of the second network element sending the first billing entry to the billing system.

17. The apparatus of claim 14, wherein the first billing entry comprises billing entries from a plurality of network elements.

18. The apparatus of claim 14, wherein the logic, when executed, is further operable to correlate billing information for a billing event together.

19. The apparatus of claim 14, wherein the traffic altering information for the flow is used to determine that the first data volume is for the billing event, and wherein the correlating network element is not able to inspect packets in the flow for the first data volume to determine that the packets are for the billing event.

20. The apparatus of claim 14, wherein the first billing entry is not sent to the billing system by the second network element through a link between the second network element to the billing system.

21. The method of claim 1, wherein the correlating network element comprises a layer 7 charging node configured to determine charging information from application layer information.

* * * * *